US011269867B2

(12) United States Patent
Riscutia et al.

(10) Patent No.: US 11,269,867 B2
(45) Date of Patent: Mar. 8, 2022

(54) GENERATING DATA RETRIEVAL QUERIES USING A KNOWLEDGE GRAPH

(71) Applicant: Microsoft Technology Licensing, LLC, Redmond, WA (US)

(72) Inventors: Vlad Riscutia, Redmond, WA (US); Gordan Kuvac, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 45 days.

(21) Appl. No.: 16/557,884

(22) Filed: Aug. 30, 2019

(65) Prior Publication Data

US 2021/0064609 A1 Mar. 4, 2021

(51) Int. Cl.
*G06F 16/242* (2019.01)
*G06F 16/25* (2019.01)
*G06F 16/901* (2019.01)
*G06F 9/451* (2018.01)

(52) U.S. Cl.
CPC .......... *G06F 16/2423* (2019.01); *G06F 9/451* (2018.02); *G06F 16/258* (2019.01); *G06F 16/9024* (2019.01)

(58) Field of Classification Search
CPC .... G06F 16/2423; G06F 9/451; G06F 16/258; G06F 16/1794; G06F 16/9024; G06F 16/242
See application file for complete search history.

(56) References Cited

U.S. PATENT DOCUMENTS

| | | | |
|---|---|---|---|
| 8,856,182 B2 | 10/2014 | Olson | |
| 9,208,223 B1 | 12/2015 | Patil et al. | |
| 9,378,303 B1 | 6/2016 | Meyer et al. | |
| 10,042,836 B1* | 8/2018 | Wang | G06Q 40/123 |
| 10,296,524 B1 | 5/2019 | Tung et al. | |
| 10,997,244 B2* | 5/2021 | Russell | G06F 16/27 |
| 2003/0212676 A1 | 11/2003 | Bruce et al. | |
| 2006/0206612 A1 | 9/2006 | Ferro et al. | |

(Continued)

OTHER PUBLICATIONS

"International Search Report and Written Opinion Issued in PCT Application No. PCT/US20/037675", dated Aug. 6, 2020, 12 Pages.

(Continued)

*Primary Examiner* — Jorge A Casanova
(74) *Attorney, Agent, or Firm* — Ray Quinney & Nebeker P.C; James Bullough

(57) ABSTRACT

The present disclosure concerns automatically generating data retrieval queries. A system may include data residing on a first data store and a knowledge graph residing on a second data store. The knowledge graph may include a semantic model of the data. The knowledge graph may be structured differently than the data and may be stored in a format different from the data. The system may include a query builder that receives one or more inputs through a user interface. The user interface may be based in part on the knowledge graph. The one or more inputs may indicate a subset of the data. The query builder may retrieve metadata from the knowledge graph based on the one or more inputs. The query builder may then generate a query for retrieving the subset of the data using the one or more inputs and the metadata retrieved from the knowledge graph.

20 Claims, 4 Drawing Sheets

(56) References Cited

U.S. PATENT DOCUMENTS

| | | |
|---|---|---|
| 2007/0260582 A1 | 11/2007 | Liang |
| 2007/0282804 A1 | 12/2007 | Bowman |
| 2011/0258212 A1 | 10/2011 | Lu et al. |
| 2014/0115001 A1 | 4/2014 | Arroyo et al. |
| 2014/0129583 A1 | 5/2014 | Munkes et al. |
| 2014/0280307 A1* | 9/2014 | Gupta .................... G06N 5/025 707/769 |
| 2014/0351261 A1 | 11/2014 | Aswani et al. |
| 2016/0371395 A1* | 12/2016 | Dumant ............ G06F 16/24575 |
| 2016/0378851 A1 | 12/2016 | Merdivan et al. |
| 2017/0371884 A1* | 12/2017 | Vermeulen ............ G06F 40/242 |
| 2018/0011903 A1 | 1/2018 | Abolhassani et al. |
| 2018/0052884 A1* | 2/2018 | Kale ................. G06F 16/24578 |
| 2018/0089328 A1 | 3/2018 | Bath et al. |
| 2018/0107760 A1 | 4/2018 | Saha et al. |
| 2018/0129690 A1* | 5/2018 | Jagannath ........... G06F 16/2453 |
| 2018/0210879 A1* | 7/2018 | Mittal ..................... G06F 40/51 |
| 2018/0210966 A1* | 7/2018 | Bedi ................... G06F 16/9024 |
| 2018/0349377 A1* | 12/2018 | Verma ................... G06F 16/248 |
| 2019/0034811 A1 | 1/2019 | Cuddihy et al. |
| 2019/0179936 A1 | 6/2019 | Javitt et al. |
| 2020/0117737 A1 | 4/2020 | Gopalakrishnan et al. |
| 2020/0210391 A1 | 7/2020 | Scott et al. |
| 2020/0272623 A1 | 8/2020 | Aggour et al. |
| 2020/0372373 A1 | 11/2020 | Tokarev Sela et al. |

OTHER PUBLICATIONS

Fan, et al., "Interactive SQL Query Suggestion: Making Databases User-Friendly", In Proceedings of IEEE 27th International Conference on Data Engineering, Apr. 11, 2011, 12 Pages.

Jayaram, et al., "Querying Knowledge Graphs by Example Entity Tuples", In Journal of Computing Research Repository, Nov. 8, 2013, pp. 1-16.

Woods, Dan, "Is The Enterprise Knowledge Graph Finally Going To Make All Data Usable?", Retrieved from https://www.forbes.com/sites/danwoods/2018/09/19/is-the-enterprise-knowledge-graph-going-to-finally-make-all-data-usable/#7025553d7d39, Sep. 19, 2018, 8 Pages.

Yahya, et al., "Exploratory Querying of Extended Knowledge Graphs", In Proceedings of the VLDB Endowment, vol. 9, Issue 13, Sep. 1, 2016, pp. 1521-1524.

"How to Trace Back the Source Tables Used in the Package", Retrieved From: https://www.bspsoftware.com/knowledgebase/how-to-trace-back-the-source-tables-used-in-the-package/, Retrieved Date: May 20, 2020, 4 Pages.

"Power BI Cleanup Tool; Time Saving with Power BI Helper", Retrieved From: https://radacad.com/power-bi-cleanup-tool-time-saving-with-power-bi-helper, Oct. 12, 2017, 20 Pages.

Johnson, et al., "Identifying Object Dependencies", Retrieved From: https://www.informit.com/articles/adicle.aspx?p=2081570&seqNum=17, Jul. 10, 2013, 2 Pages.

"Application as Filed in U.S. Appl. No. 16/871,747", filed May 11, 2020, 57 Pages.

"FOLDOC: Free Online Dictionary of Computing", Retrieved From: http://foldoc.org/relational%20database, Jun. 10, 2002, 3 Pages.

"Non Final Office Action Issued in U.S. Appl. No. 16/912,139", dated Aug. 17, 2021, 31 Pages.

Aggour, et al., "Federated Multimodal Big Data Storage & Analytics Platform for Additive Manufacturing", In Proceedings of the IEEE International Conference on Big Data (Big Data), Dec. 9, 2019, pp. 1729-1738.

"International Search Report and Written Opinion Issued in PCT Application No. PCT/US2021/027866", dated Aug. 5, 2021, 13 Pages.

* cited by examiner

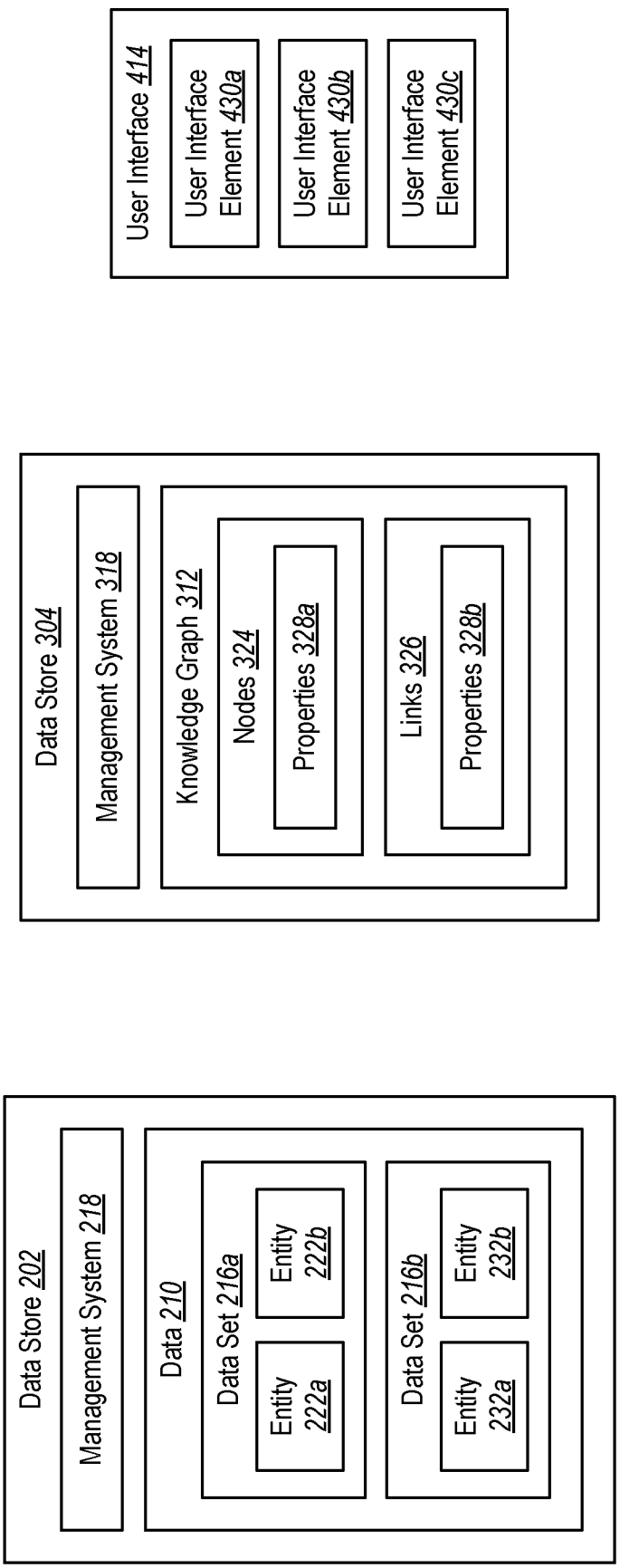

GENERATING DATA RETRIEVAL QUERIES USING A KNOWLEDGE GRAPH

CROSS-REFERENCE TO RELATED APPLICATIONS

N/A

BACKGROUND

Data may be stored in a database. A database is an organized collection of data. Retrieving information from the database may involve formulating a query in a query language understood by the database. A user may formulate a query describing information the user wants to retrieve from the database and submit the query to the database. In response, the database may return the requested information.

A database may contain a large amount of data. The amount of data contained in a database may make it difficult to review the data. The amount of data contained in a database may also make it difficult to draw conclusions from the data. Large databases may also contain various types of information. The diversity of information contained in a database may make it difficult to review and understand the data.

Individuals and entities may use data analytics to better understand data. In general terms, the term "data analytics" refers to the process of examining data to discover trends, patterns, and correlations that may otherwise be hidden in large amounts of data. Individuals and entities may use insights discovered from examining data to optimize processes or increase overall efficiency of a business or system.

SUMMARY

In accordance with one aspect of the present disclosure, a method is disclosed for generating a data retrieval query. The method includes receiving one or more inputs specifying a subset of data. The data resides on a data store. The method also includes retrieving, based on the one or more inputs, metadata associated with the subset of the data. The metadata contained in a knowledge graph includes a semantic model of the data. The method also includes generating the data retrieval query based on the one or more inputs and the metadata.

The knowledge graph may reside on a second data store. The second data store may be distinct from the data store. The knowledge graph may have a second structure different from a first structure of the data.

The knowledge graph may be stored on the second data store in a second format different from a first format in which the data is stored on the data store. The second format may be based at least in part on the second structure. In some embodiments, the knowledge graph may be stored on the second data store as simple tables or NoSQL documents.

The method may further include generating a user interface based on the knowledge graph. The user interface may include one or more user interface elements that allow a user to enter the one or more inputs specifying the subset of the data.

The method may further include providing the data retrieval query to the user. In addition, the method may include using the data retrieval query to extract the subset of the data and generate a report using the subset of the data.

The data may include a first data set and a second data set and the subset of the data may include at least a portion of the first data set and at least a portion of the second data set.

The metadata retrieved from the knowledge graph may include information about joining information in the first data set and information in the second data set.

The data includes two or more entity types, and the knowledge graph may include properties for each entity type.

In accordance with another aspect of the present disclosure, a system for generating a data retrieval query is disclosed. The system includes one or more processors, memory in electronic communication with the one or more processors, and instructions stored in the memory. The instructions are executable by the one or more processors to receive information specifying a subset of data contained in one or more data sets. The subset of the data relate to at least one entity type. The instructions are further executable by the one or more processors to access a knowledge graph that includes a semantic model of the data contained in the one or more data sets. The instructions are further executable by the one or more processors to retrieve, from the knowledge graph, metadata associated with the subset of the data. The metadata includes properties of the at least one entity type. The instructions are further executable by the one or more processors to generate the data retrieval query.

The one or more data sets may reside on a first data store and the knowledge graph may reside on a second data store. The second data store may be distinct from the first data store.

The knowledge graph may be structured as a graph database. The knowledge graph may be stored on the second data store in a format optimized for querying a graph database.

The instructions may be further executable by the one or more processors to generate a user interface based on the knowledge graph. The user interface may include one or more user interface elements that allow a user to enter one or more inputs specifying the subset of the data.

The instructions may be further executable by the one or more processors to provide the data retrieval query to the user.

In accordance with one aspect of the present disclosure, a computer-readable medium is disclosed that includes instructions that are executable by one or more processors to cause a computing system to access a knowledge graph residing on a data store. The knowledge graph contains a semantic model of data. The instructions are also executable by the one or more processors to create, based on the knowledge graph, a user interface. The user interface includes one or more user interface elements. The user interface elements allow a user to indicate a subset of the data. The instructions are also executable by the one or more processors to receive one or more inputs from the user through the one or more user interface elements. The one or more inputs indicate the subset of the data. The instructions are also executable by the one or more processors to generate, based on the one or more inputs, a first query for retrieving metadata from the knowledge graph. The metadata include information associated with the subset of the data. The instructions are also executable by the one or more processors to receive the metadata and generate, based on the one or more inputs and the metadata, a second query for retrieving the subset of the data.

The computer-readable medium may further include additional instructions that are executable by the one or more processors to cause the computing system to update the user interface based on changes to the knowledge graph.

The first query may be in a first query language, the second query may be in a second query language, and the first query language may be different from the second query language.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 2 illustrates an example of a data store that may contain data and be queried for a subset of the data.

FIG. 3 illustrates an example of a data store that may contain a knowledge graph for use in automatically building a query for obtaining information from data.

FIG. 4 illustrates an example user interface that may receive one or more inputs from a user that indicate a subset of data.

DETAILED DESCRIPTION

Figure 1:
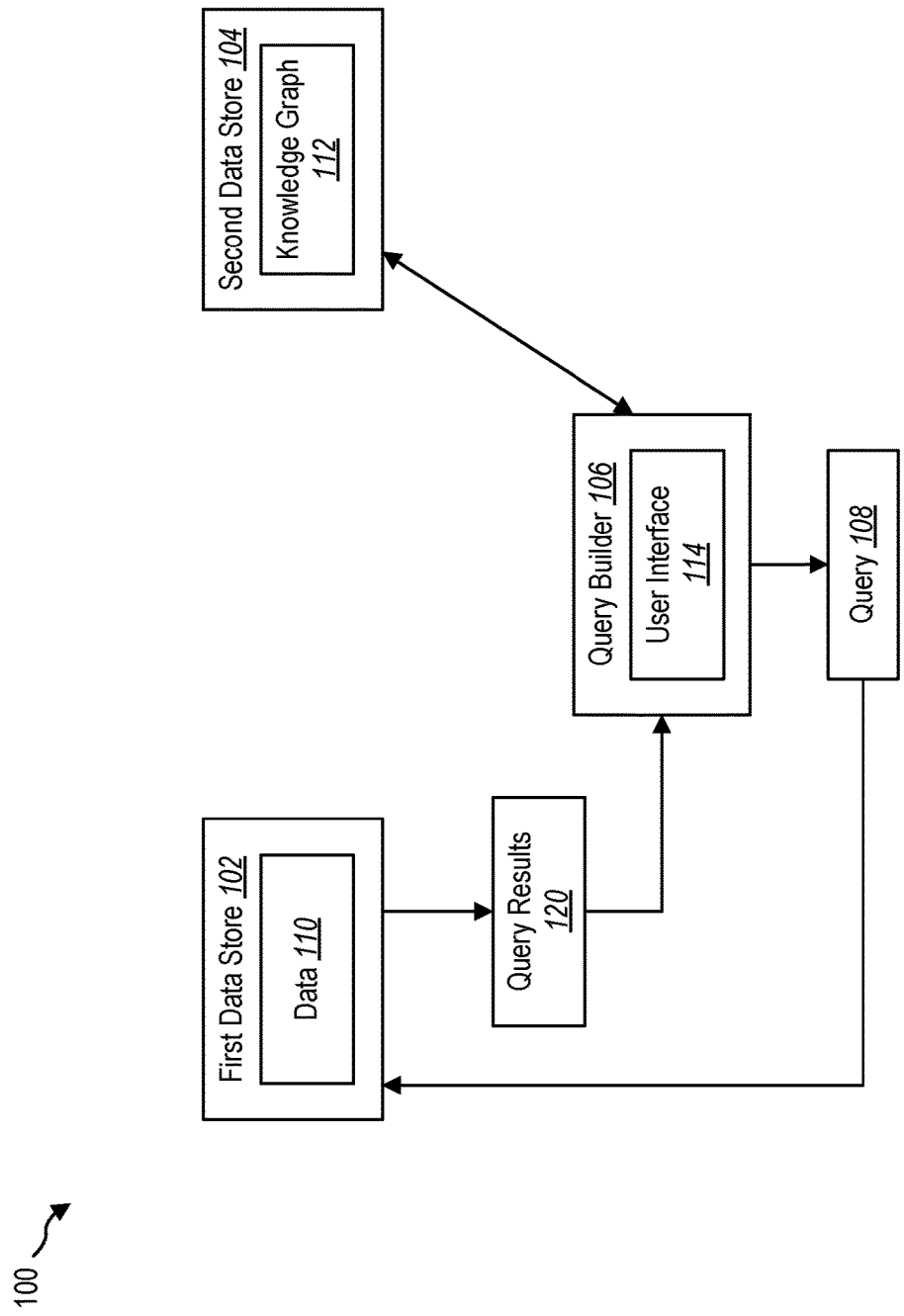
FIG. 1 illustrates an example of a system for automatically generating a data retrieval query using a knowledge graph.

This disclosure relates generally to generating data retrieval queries. One aspect of the present disclosure concerns using a semantic model of data to automatically generate a data retrieval query for extracting a subset of the data indicated by one or more user inputs.

A business (or person or entity) may collect large amounts of data associated with its business. The business may analyze the data to discover trends, patterns, metrics, relationships, and correlations that would otherwise be hidden in large amounts of data. The business may use insights gained from analyzing the data to improve its business. For example, manufacturing companies may analyze data about the runtime, downtime, and work queue for various machines in order to better plan workloads so that the machines operate more efficiently. Marketing organizations may analyze consumer purchase and/or survey data to determine the outcomes of advertising campaigns and to guide decisions for consumer targeting. Scientists and researchers may analyze test results to verify or disprove scientific models, theories and hypotheses.

Analyzing data may include extracting portions of the data relevant to a particular analysis. The data may reside on a data store. Extracting a portion (or subset) of the data may involve formulating a query that specifies the subset of the data. The query may need to be in a query language the data store understands. Extracting the subset of data may involve joining multiple data sets contained in the data, filtering the data, or performing other operations. The contents and structure of the query may depend on how the data is organized and structured, including how different elements contained in the data relate to each other.

The data may include multiple data sets and a wide range of element types that relate to each other in a variety of different ways. The complexity of the data may make it difficult and time consuming to manually generate a query to extract a relevant subset of data needed for a particular analysis or report. The complexity of the data may also increase the likelihood that manually generating multiple queries will result in inconsistencies among or errors in some of the queries, especially where multiple different users formulate the queries. Subsets of data pulled using inconsistent or erroneous queries may be different from the information a user or a set of users understood was being pulled. Analysis of subsets of data pulled using inconsistent or erroneous queries may lead to improper or incorrect conclusions about the data. Improving the process of generating queries for complex data (such as by increasing the speed with which queries can be generated or the accuracy of queries) may increase the usefulness of the data and the data store on which the data resides and allow a business to better use the data and the data store to improve its business.

Maintaining a separate database containing a semantic model of the data set may help improve the process of generating queries for complex data and may facilitate automatic query generation. The semantic model may describe properties of the different types of information contained in the data and the relationships that exist between the different types of information. The semantic model may also describe how different data sets or types of information contained in the data can be joined and filtered. The semantic model may contain information about the data that is not contained in the data and that cannot be ascertained from querying the data.

The semantic model may be structured in a way different from the data it describes. The semantic model may be structured according to a data model that suits or is optimal for the information contained in the semantic model. There may be a data model that represents or captures the information contained in the semantic model better than one or more other models. The data model that suits or is optimal for the semantic model may be different from the data model of the data. That may be because the information contained in the semantic model (such as information about the information contained in the data) is different from the information contained in the data (such as raw data that describes a real world system). As one example of how the semantic model may be structured differently from the data, consider a situation in which the data is structured as a relational database. It may be that a relational database would not be suited or optimal for the semantic model. It may be that a graph database model more effectively and efficiently captures the various relationships between elements contained in the data. It may be that a graph database model represents the type of information contained in the semantic model better than a relational database does. It may be that a graph database model more efficiently captures the type of information contained in the semantic model than a relational database does.

The semantic model may be stored on a second data store in a way different from how the data is stored on a first data store. It may be beneficial to store the semantic model in a format that is suited to or optimized for the structure of the semantic model. In situations in which the semantic model and the data are structured based on different data models, it may be that the format suited to or optimized for the semantic model is different from the format in which the data is stored. For example, where the semantic model is structured according to a graph database model and the data is structured according to a relational database model, the semantic model may be stored in a format that is suited for querying a graph database while the data may be stored in a format that is optimized for querying a relational database. Storing the semantic model in a format specifically suited for querying the semantic model—as opposed to storing the semantic model in the same format as the data—may improve the speed with which metadata stored in the semantic model can be obtained and used and may also reduce the amount of memory needed to store the semantic model.

A query builder may use the semantic model to generate a query to extract a subset of the data. The query builder may include a user interface. The contents of the user interface may be based on the semantic model. The user interface may receive input from a user that indicates the information the user wants to extract from the data. The query builder may take the input from the user and, based on the input, extract metadata from the semantic model. The metadata may include information associated with the information the user wants to extract from the data. The metadata may be information not contained in the data and that cannot be ascertained from querying the data. The query builder may then use the input and the metadata extracted from the semantic model to generate a query that can be used to extract the indicated information. The query builder may provide the query to the user or use the query to extract the desired subset of the data from the data store. The query builder may use the extracted data to generate a report. The query builder may also provide the extracted data to a data analytics program.

Automatically generating queries using a semantic model of raw data may result in consistent and fast query generation that improves a user's ability to analyze the raw data and make use of the data store on which the raw data resides. Using a semantic model to automatically generate queries relieves a user of having to know or learn all the properties of the data. Maintaining the semantic model on a data store separate from the raw data may allow for faster and more efficient automatic query generation. When the semantic model resides on a data store separate from the raw data, the semantic model can be structured and formatted in a way different from the structure and format of the raw data. Structuring the semantic model according to a data model suited to the type of information contained in the semantic model and storing the semantic model in a format suited to the structure of the semantic model may allow a system to store the semantic model more efficiently and retrieve metadata from the semantic model faster and thus improve the speed and efficiency of automatically generating queries.

FIG. 1 illustrates an example of a system 100 in which the techniques disclosed herein may be utilized. The system 100 may include a first data store 102, a second data store 104, a query builder 106, a query 108, and query results 120.

The first data store 102 may include data storage or data repository and may contain data 110. The data 110 may contain one or more discrete pieces of information or data elements. The data 110 may describe, concern, or be related to the real world or a system existing in the real world. For example, the data 110 may include information related to a business that sells subscriptions to its services. In such a situation, the data 110 may include information about persons who and entities that have purchased subscriptions, the active subscriptions the business has, the cancelled subscriptions, the uses customers make of the business' services, and complaints received about the business' services.

The data 110 may be stored on the first data store 102 in a way that allows a user to request that the first data store 102 extract a specific portion or subset of the data 110. For example, the data 110 may be organized in a database with tables that include one or more records, each record including one or more fields. The first data store 102 may be able to extract specific tables, specific records in specific tables, or specific fields associated with specific records in specific tables. The first data store 102 may be able to perform one or more operations on the data 110 as part of extracting a portion of the data 110. Requesting information from the first data store 102 may require that the query be in one or more particular query languages. The query may be in the form of a string of characters.

The data 110 may be structured according to a data model. The data model may specify how elements of information in the data 110 relate to one another and to the real world. The data model may include entity types, object types, activity types, event types, identity types, attributes, members, relationships, and integrity rules. Entity types, object types, activity types, and event types may map to real world objects and events. Those real world objects and events may have different attributes, characteristics, and relationships.

The data model that describes the data 110 may be complex. The data 110 may include multiple different data sets and many entity types. Each entity type may have multiple attributes and may have a variety of different relationships with other entity types in the data 110. The complexity of the data 110 may make it difficult to formulate a query for extracting relevant information from the data 110, join information contained in the data 110 (such as information from different data sets or information related to different entities), and filter information extracted from the data 110 (such as de-duplicating information pulled from two different data sets or narrowing the data 110 to a defined segment).

The second data store 104 may include data storage or data repository. The second data store 104 may be separate from the first data store 102. The second data store 104 may include a knowledge graph 112. The knowledge graph 112 may contain or represent a semantic model of the data 110. The semantic model may be metadata. The semantic model may describe the data 110 and the information contained in the data 110. The semantic model may describe the properties of the data 110. The semantic model may reflect the data model that represents the data 110. The semantic model may describe how the data 110 relates to the real world. The semantic model may include information describing the relationships between data elements contained in the data 110, how to join data elements and data sets contained in the data 110, what information can be joined, how different data elements map to each other, and how to filter information extracted from the data 110.

The knowledge graph 112 may contain information sufficient to generate a query (such as the query 108) to obtain a specific subset of data from the data 110. The knowledge graph 112 may information describing how to find particular information in the data 110. The knowledge graph 312 may include information for how to perform one or more operations for extracting particular information from the data 110. The knowledge graph 112 may contain information not contained in the data 110 and not ascertainable from querying the data 110.

The knowledge graph 112 may be stored on the second data store 104 in a way that allows the second data store 104 to extract specific information from the knowledge graph 112. Requesting information from the second data store 104 may require that the query be in one or more particular query languages.

The semantic model contained in the knowledge graph 112 may be structured according to a data model different from the data model that represents the structure of the data 110. The structure of the knowledge graph 112 may be chosen based on the type of information contained in and the logical structure of the semantic model. The structure of the knowledge graph 112 may be chosen based on the types of relationships that exist between and among information contained in the semantic model. The structure of the data 110 may, in contrast, be based on the type of information contained in the data 110 and the types of relationships that may exist among the types of information contained in the data 110. Because the type of information contained in the semantic model may be different from the type of information in the data 110, the structure of the knowledge graph 112 may be different from the structure of the data 110. For example, it may be that a graph database model may effectively and efficiently represent the semantic model contained in the knowledge graph 112. Thus, the knowledge graph 112 may be structured according to a graph database model. The data 110, in contrast, may be structured according to a relational database based on the type of information contained in the data 110. It may be that a relational database is not as well suited for the semantic model as a graph database or one or more other data models. For example, it may be that structuring the semantic model according to a relational database would be less efficient than structuring the semantic model according to a graph database. It may be that structuring the semantic model according to a relational database would be more complex or more difficult than structuring the semantic model according to a graph database.

The knowledge graph 112 may be stored on the second data store 104 in a format different from the format in which the data 110 is stored on the first data store 102. The knowledge graph 112 may be stored in the second data store 104 in a format that is optimized or suited for retrieving information from the knowledge graph 112 while the data 110 may be stored on the first data store 102 in a way that is optimized or suited for retrieving information from the data 110. It may be that the type of information, volume of information, or relationships between information contained in a particular data store impact whether one format is better than another format for retrieving data from the particular data store. Thus, it may be that differences in the type of information, volume of information, or relationships between information contained in the knowledge graph 112 and the data 110 make it beneficial to store the knowledge graph 112 in a format different from the format in which the data 110 is stored. Furthermore, it may be that storing the knowledge graph 112 in a format different from the data 110 (rather than in the same format as the data 110) may result in faster and more efficient retrieval of information from the knowledge graph 112. In some cases, the format of the knowledge graph 112 may be based at least in part on the structure of the knowledge graph 112 (i.e., the data model that represents the knowledge graph 112), and the format of the data 110 may be based at least in part on the structure of the data 110. Because the structure of the knowledge graph 112 may be different from the structure of the data 110, it may be beneficial to have the knowledge graph 112 stored in a format different from the format in which the data 110 is stored. Storing the knowledge graph 112 based on the structure of the knowledge graph 112 may improve the speed and efficiency with which desired information can be extracted from the knowledge graph as compared to storing the knowledge graph 112 in a format that does not account for the structure of the knowledge graph 112. It may also be that some formats for storing the knowledge graph 112 may require less memory than other formats. It may be that storing the knowledge graph 112 based on the structure of the knowledge graph 112 allows the knowledge graph 112 to be stored more efficiently than using one or more other formats.

The query builder 106 may include a user interface 114. The user interface 114 may be displayed to one or more users. The user interface 114 may be displayed visually on a display screen. The user interface 114 may be displayed at a location separate from the location of the query builder 106. A user may be able to interact with the user interface 114 using one or more input devices. The user interface 114 may be a graphical user interface that includes elements a user manipulates to produce inputs that indicate or specify a subset of the data 110. The query builder 106 may generate the user interface 114 using the knowledge graph 112. The user interface 114 may be based on the knowledge graph 112. The elements included in the user interface 114 may be based on metadata contained in the knowledge graph 112. The query builder 106 may automatically modify the user interface 114 based on changes to the knowledge graph 112. The query builder 106 may be implemented in a cloud-based system.

The query builder 106 may receive one or more inputs from the user interface 114. The query builder 106 may, based on the one or more inputs, retrieve information from the knowledge graph 112. The query builder 106 may retrieve the information from the knowledge graph 112 by generating a query and submitting the query to the second data store 104. The retrieved information may be metadata associated with the subset of the data 110 indicated or specified by the one or more inputs.

The query builder 106 may create the query 108 based on the inputs and the information retrieved from the knowledge graph 112. The query 108 may describe the subset of the data indicated or specified by the one or more inputs. The query 108 may include one or more subqueries or may comprise multiple queries. The query 108 may include instructions that enable the first data store 102 to retrieve the subset of the data indicated or specified by the one or more inputs. For example, the query 108 may include instructions about one or more operations to perform in order to obtain the subset of the data 110 indicated or specified by the one or more inputs. The query 108 may be a string of characters. The query 108 may be in a query language understood by the first data store 102. The query 108 may be consumable by the first data store 102. The query language of the query 108 may be different from the query language of the query used to retrieving information from the second data store 104 and the knowledge graph 112.

The query 108, when submitted to the first data store 102, may cause the first data store 102 to extract information from the data 110 and return the query results 120. The query results 120 may include information responsive to the query 108. The query results 120 may be or include the subset of the data 110 indicated or specified by the one or more inputs. Returning the query results 120 may involve the first data store 102 joining two or more data sets, filtering the data 110, or other operations. The content of the query 108 may instruct the first data store 102 about what operations to perform and how to perform the operations.

The query builder 106 may provide the query 108 to the user. For example, the query builder 106 may display the query on a display screen visible to the user. In the alternative or in addition to providing the query 108 to the user, the query builder 106 may submit the query 108 to the first data store 102. In that case, the query builder 106 may generate and display a report to the user based at least in part on the query results 120. The query builder 106 may submit the query results to an analytics application. The analytics application may output results from analyzing the query results 120. The outputted results may be in a visual form and may be presented to the user.

The system 100 may allow the user to make better use of the data 110 and the first data store 102. It may be difficult and tedious for the user to manually create the query 108. The data 110 may include many different data sets and many different elements that have a variety of relationships. The complexity of the data 110 may mean that the query 108 necessary to obtain the query results 120 is complex and that creating the query 108 requires detailed knowledge of the data 110, data sets contained in the data 110, and the relationships between and among the many different elements contained in the data 110.

The system 100 may improve and simplify the process of building the query 108 in multiple ways, such as, by way of example, the following.

First, the knowledge graph 112 and the user interface 114 allow a user to more easily indicate or specify the information the user wants from the data 110. The query builder 106 generates the user interface 114 based on the knowledge graph 112 and automatically updates the user interface 114 based on changes to the knowledge graph 112. Thus, the user interface 114 and the knowledge graph 112 relieve the user of the burden of having to maintain or develop a detailed and broad understanding of the contents of the data 110.

Second, the query builder 106 and the knowledge graph 112 allow for automatic and consistent generation of the query 108. Because the knowledge graph 112 maintains a semantic model of the data 110 with information sufficient to generate the query 108, the user does not need to rely on the user's own knowledge and understanding of the data 110 to create the query 108. Nor does the user need to analyze documentation containing such information each time the user creates a query. Instead, the query builder 106 can automatically generate the query based on the one or more inputs and the knowledge graph 112. The query builder 106 also relieves the user of having to maintain or obtain a detailed knowledge of the query language used by the first data store 102. Moreover, because the query builder 106 automatically generates the query based on the knowledge graph 112 and the one or more inputs, the query builder 106 will generate consistent queries as long as the knowledge graph 112 and the one or more inputs are consistent.

Third, maintaining the knowledge graph 112 separate from the data 110 means the knowledge graph 112 can be structured differently from the data 110 and in a way that better suits the type of information in the knowledge graph 112. Structuring the knowledge graph 112 in a way that suits the type of information contained in the knowledge graph 112 may make it easier to build and update the knowledge graph 112 and easier to store the knowledge graph 112 in a format optimized for retrieving information from the knowledge graph 112.

Fourth, maintaining the knowledge graph 112 on a separate data store from the data 110 means the knowledge graph 112 can be stored in a format that is different from the format of the data 110 and that allows for faster and more efficient retrieval of information from the knowledge graph 112.

FIG. 2 illustrates an example of a data store 202 that includes data 210. The data store 202 may be any system or device capable of storing electronic information. The data store 202 may be any form of data storage or data repository such as a database, data warehouse, or other type of structured or unstructured data storage. The data store 202 may store the data 210.

The data 210 may include discrete data elements. The data 210 may include information regarding the real world or a system that exists in the real world. The data 210 may be structured and stored on the data store 202 according to a data model. A data model may determine or describe the logical structure of the data 210 and determine or describe how the data 210 is or may be stored, organized, and manipulated. The data 210 may be structured and stored according to any of a variety of data models.

One example data model is a database. The database model includes a variety of different types. A database may comprise a relational database (which may be a collection of data items organized as a set of formally described tables from which data can be easily accessed), object-oriented database, hierarchical database, network database, other types of database, some combination or extension of the above, and the like. Data stored in a database may be organized in tables, records, objects, other data structures, and the like. Data stored in a database may be stored in dedicated database files, dedicated hard drive partitions, HTML files, XML files, spreadsheets, flat files, document files, configuration files, other files, and the like. A database may include indices and stored procedures. Tables stored in a database may include one or more of hypertext markup language (HTML) tables, resource description framework (RDF) tables, web ontology language (OWL) tables, and/or extensible markup language (XML) tables, for example. A database may reference a set of data that is read-only to the database or may have the ability to read and write to the set of data.

A user may access the data 210 in the data store 202 through a management system 218. The management system 218 may include one or more programs that control organization, storage, management, and retrieval of the data 210 stored on the data store 202. The management system 218 may receive requests to access the data 210 and may extract the requested portion of the data 210. Access as used herein may include reading data, extracting data, writing data, deleting data, updating data, a combination including two or more of the above, and the like.

Requests to the data store 202 to access the data 210 may be in the form of queries. The data store 202 may receive queries from users, applications, or other entities. The data store 202 may execute a query to produce a results dataset and return the results dataset to the entity that submitted the query. The queries may be represented using a query language (such as Structured Query Language (SQL)). The data store 202 may require that queries be in or more particular query languages.

The data 210 may include multiple data sets, such as data sets 216a, 216b. Although the data 210 is shown with only two data sets, the data 210 may include any number of data sets. The data sets 216a, 216b may be discrete subparts of the data 210. The data sets 216a, 216b may each contain a separate collection of information. There may be some information that is contained in both the data set 216a and the data set 216b. In other situations, the data set 216a and the data set 216b may not contain any of the same information.

The data set 216a may include data associated with entities 222a, 222b. The data set 216b may include data associated with entities 232a, 232b. The entities 222a, 222b may be of a different type than entities 232a, 232b. The entity type of the entities 222a, 222b may have one or more relationships or associations with the entity type of the entities 232a, 232b. An entity may represent a specific object (such as a specific employee, a specific customer, a specific account, a specific piece of hardware, etc.). Each entity may be a particular entity type. For example, a specific employee entity may be an employee entity type and a specific customer entity may be a customer entity type. Entity types may include properties that define their structure and characteristics. For example, a customer entity type may have properties such as customer ID, name, and email.

By way of example, assume a situation where the entities 222a, 222b are user entity types and the entities 232a, 232b are subscription entity types. It may be that subscription entity types identify the user who owns the subscription. It may be that the relationship between a subscription and a user is that each subscription is owned by at least one user. As another example, assume multiple data sets are used to store information associated with various servers of a cloud-computing system. Also assume that an event may be something that happens to a server. Some examples of events may include shutting down unexpectedly, experiencing hardware failure, overheating, booting up, etc. It may be that the data set 216a is a list of all events that have happened to one server and contains certain information associated with each event while the data set 216b is information about each instance of one particular type of event (such as overheating) that has happened to any server in the system and includes certain information more specific to overheating events.

The data sets 216a, 216b or certain information contained in the data sets 216a, 216b may relate to each other in particular ways. For example, where the data set 216a contains user entity information and the data set 216b contains subscription entity information, members of the data set 216a may own members of the data set 216b. As another example, where the data set 216a contains event information for a particular server and the data set 216b contains overheating event information for all servers in a system, the data set 216b may provide more information about an overheating event listed in the data set 216a.

There may be ways to join information contained in the data sets 216a, 216b and filter information contained in the data sets 216a, 216b. For example, assume the data set 216a contains user entity information and the data set 216b contains subscription entity information. Further assume that the user entity type contains information about the age of a user. Also assume that the subscription entity type contains information about the date a subscription was purchased. Assume that the data store 202 receives a request for the ages of all users who purchased their subscription in a certain date range. Fulfilling such a request may involve joining the user information in the data set 216a with the subscription information contained in the data set 216b. Joining user information with subscription information may depend on how information in the data set 216a is structured, how information in the data set 216b is structured, and how user information relates to subscription information. Joining the user information with the subscription information may involve resolving situations where a single user has more than one associated subscription. There may be defined rules for joining information. Properly joining information contained in the data 210 may require knowledge of those rules. Properly joining information may also require knowledge of how data elements within the data 210 relate to each other.

There may be ways to filter information retrieved from the data 210. For example, responding to a query may involve filtering out information that a user does not want or filtering out duplicate information contained in two joined data sets. Responding to a query may also involve filtering the data 210 to obtain a defined segment or a cohort. There may be defined rules for filtering information in the data 210. Properly filtering information contained in the data 210 may require knowledge of those rules. Properly information may also require knowledge of how data elements within the data 210 relate to each other.

Obtaining a specific subset of information from the data 210 may require knowledge of the structure of information contained in the data 210. For example, obtaining a specific subset of information may require knowing that the data 210 includes the data set 216a and the data set 216b and knowing that the data set 216a includes entities of a first entity type while the data set 216b includes entities of a second entity type. It may also require knowledge of the relationships between the data set 216a and the data set 216b and the relationships between the first entity type and the second entity type.

Obtaining a specific subset of information from the data 210 may also require knowing how to join and filter the information or how to perform one or more other operations on the data 210 in order to obtain a subset of the data 210. It may require knowledge of defined rules for joining and filtering the data 210. It may require knowledge of rules associated with performing the one or more other operations on the data 210.

The complexity of the data 210 and rules associated with the data 210 may make manually generating a query to obtain a specific subset of information from the data 210 difficult and time consuming.

Although FIG. 2 shows the data 210 organized using data sets and entities, the data 210 may be organized and structured according to any model, organization, or structure. For example, data may be organized into multiple databases.

FIG. 3 illustrates an example of a data store 304 and an example of a knowledge graph 312. The data store 304 may be any system or device capable of storing electronic information. The data store 304 may be any form of data storage or data repository such as a database, data warehouse, or other type of structured or unstructured data storage. The data store 304 may store the knowledge graph 312.

The knowledge graph 312 may contain a semantic model of data, such as the data 210. The semantic model may contain information about the data (metadata). The semantic model may contain higher level information about data. The semantic model may describe how information in data relates to the real world. The semantic model may describe properties of the different types of information contained in the data. For example, the semantic model may describe properties of entity types and activity types contained in the data. The semantic model may describe how different aspects of the data relate to each other (such as relationships between and among different entity types, between and among different activity types, and between and among entity types and activity types). By capturing semantics behind the data, the knowledge graph 312 enables better understanding of the contents of the data, how to access the data, and how to extract a specific subset of information from the data. The knowledge graph 312 may be created using a combination of automation and manual implementation.

The knowledge graph 312 may include information that facilitates obtaining a specified subset of data. The knowledge graph 312 may include information for finding in the data the specified subset of data. The knowledge graph 312 may include information for how to perform one or more operations for extracting the specified subset of data from the data. The knowledge graph 312 may include an object model of the data.

For example, the knowledge graph 312 may store information about how joins can be performed or rules for how joins are to be performed. Joining information may involve knowing the different entity types that include information about a particular activity or event type of that is of interest. Joining information may involve knowing how to aggregate data associated with two different entity types or in two different data sets. The knowledge graph 312 may include rules for joining and aggregating information. The knowledge graph 312 may store information about how to map information associated with one entity type to information associated with another entity type. The knowledge graph 312 may store information about what entity types have associated attributes, events, or activities that may relate to another entity type. The knowledge graph 312 may store information about data filtering or rules on how filtering should be performed. The knowledge graph 312 may store information about how to filter the data to obtain a defined group or segment of the data. The knowledge graph 312 may store information about deduping (such as all the sources where duplicate information resides or rules for removing duplicate information when joins are performed). The knowledge graph 312 may include information about sampling. The knowledge graph 312 may include information about other operations that may be performed on data in order to retrieve a subset of the data.

The knowledge graph 312 may include definitions. The definitions may include defined ways to group information contained in the data. The definitions may include defined ways to segment the information contained in the data. These definitions may define segments or cohorts based on the values of attributes associated with an entity type. The definitions may be used for joining information, filtering information, or performing other operations. The definitions may be used in a user interface. These definitions may be based on how the data relates to the real world. For example, the knowledge graph 312 may define cohorts of customers based on how much customers spend. Continuing with that example, the knowledge graph 312 may define, based on the type of spending a business sees from its customers, four cohorts for customers based on spending, each cohort capturing a different range of spending (e.g., $0 to <$100, $100 to <$500, $500 to <$10,000, and $10,000+). The knowledge graph 312 may also define other ways to segment customers, such as based on age or based on average times per month a customer purchases goods or services from a business. Thus, the knowledge graph 312 may define multiple ways to segment an entity type.

The knowledge graph 312 may be structured according to a data model. For example, the knowledge graph 312 may be organized as a graph. In mathematical terms, a graph may be a collection of elements. These elements, which may be referred to as nodes (or vertices), may be joined together by links (or edges). Nodes and links may have associated properties. Each node may represent an entity to which information can be attached. For example, nodes represent entities such as people, businesses, accounts, or any other item of interest. Links connect nodes to other nodes, and each link may represent a relationship between connected entities. Properties represent particular information about nodes or links. Data related to the nodes may be stored as properties of the nodes, whereas data related to the links may be stored as properties of the links. Graphs are extremely useful in understanding a wide diversity of datasets. Meaningful patterns may emerge when examining the connections and interconnections of nodes, links, and properties.

Information that may be represented as a graph may be stored in a graph database. A graph database is a type of database in which one or more graphs are used to model the structural relationships between data objects in data. Graph databases enable users to leverage complex and dynamic relationships in highly connected data (i.e., data whose interpretation and value requires an understanding of the ways in which its constituent elements are related) in order to generate insight and competitive advantage. Graph databases have helped solve important problems in a number of technical areas, including social networking, master data management, fraud detection, recommendation engines, and bioinformatics applications.

Graph databases allow simple and fast retrieval of complex hierarchical structures that may be difficult to model in relational systems. With relational databases, join-intensive query performance tends to deteriorate as the dataset gets larger. In contrast, with a graph database performance tends to remain relatively constant, even as the dataset grows. This is because queries of graph databases are typically localized to a portion of the graph, so that the execution time for each query is proportional only to the size of the part of the graph that was traversed to satisfy the query, rather than the size of the overall graph. As a result, graph databases are increasingly being used to model large, complicated datasets. A graph model may be the most effective way to represent a semantic model of a large, complex dataset.

The knowledge graph 312 may be stored on the data store 304 in a particular format. The format may depend in part on how the knowledge graph 312 is structured. The knowledge graph 312 may be stored as simple tables or NoSQL documents. A NoSQL database may allow for storage and retrieval of data that is modeled in means other than the tabular relations used in relational databases. A NoSQL system may support SQL-like query languages or sit alongside SQL database. The data structures used by NoSQL databases may be different from those used by default in relational databases and may make some operations faster in NoSQL.

When organized as a graph, the knowledge graph 312 may include nodes 324 and links 326 that connect the nodes 324 to one another. The nodes 324 may include properties 328a, and the links 326 may include properties 328b. The properties 328a-b may take the form of key-value pairs that may include different types of values (e.g., string, Boolean, number). In addition, in some designs, the nodes 324 and the links 326 may also include other types of attributes, such as identifiers and labels. Identifiers may uniquely identify each element (node or link) of a graph. Labels may include unique string elements that may be used to identify types of objects (nodes or links).

The knowledge graph 312 may include a node for each type of record contained in the one or more data sets. For example, where the one or more data sets include entity types and event types, the knowledge graph 312 may include a node for each entity type and each event type contained in the one or more data sets. The properties of each node may describe the entity or event type, such as describing the attribute categories associated with the entity or event type. The properties may also describe how to join information associated with the entity or event type with other information. The properties may also describe how to filter information associated with the entity or event type. The properties may describe how to perform one or more other operations involving the entity or event type. The knowledge graph 312 may also include a node for each segment or cohort.

The knowledge graph 312 may include a link for each relationship between each type of record contained in the one or more data sets. For example, where the one or more data sets include multiple entity types, the knowledge graph 312 may include a link for each set of entity types that have a relationship. The properties of the links may describe the relationship between the connected entity types. The properties of the links may describe how to join or filter information associated with the connected entity types. The properties of the links may describe how to perform one or more other operations involving the connected entity types.

The data store 304 may be optimized for storing and querying a graph. The data store 304 may include a management system 318. The management system 318 may receive a query and execute the query against the knowledge graph 312 to obtain query results. The query results may include data responsive to the query. In particular, the query results may include nodes 324, links 326, and properties 328a-b that satisfy the query. The management system 318 may require that the query be in one or more particular query languages.

Although FIG. 3 shows the knowledge graph 312 organized with the nodes 324 and the links 326, the knowledge graph 312 may be organized and structured according to any model, organization, or structure.

FIG. 4 illustrates an example user interface 414. The user interface 414 may be displayed to a user on a display device (such as a computer monitor or a screen of a tablet). The user may be able to interact with the user interface 414 using one or more input devices (such as a mouse, a keyboard, or a touchscreen).

The user interface 414 may include user interface elements 430a, 430b, 430c. A user may interact with the user interface elements 430a, 430b, 430c to generate one or more inputs. The user interface elements 430a, 430b, 430c may be any of a variety of different interactive features such as drop down menus, check boxes, text boxes, radio buttons, list boxes, buttons, drop down buttons, toggles, calendars, sliders, menus, etc.

The user interface 414 may be based on the contents of a knowledge graph, such as knowledge graph 112. Thus, the user interface 414 may reflect the particular type of data stored in one or more data sets described in a knowledge graph. The user interface 414 may also reflect definitions contained in a knowledge graph regarding how to group information (such as particular segments or cohorts that may exist for particular entity types).

The user interface 414 may be dynamic. A query builder may automatically update the user interface 414 in response to user input. The query builder may also automatically update the user interface 414 based on changes to a knowledge graph, such as knowledge graph 112.

The user interface 414 may allow a user to specify or indicate a subset of information contained in one or more data sets. The user may specify the subset by interacting with the user interface elements 430 and generating one or more inputs that specify or indicate the subset of information contained in one or more data sets. For example, the user interface 414 may include a drop down menu that allows the user to select an entity type. The user interface 414 may include check boxes that allow the user to select certain attributes that the selected entity type may have. The user interface 414 may include a second drop down menu that allows the user to select an activity type. The user interface 414 may include a calendar that allows the user to specify a date range applicable to the activity type. A user interacting with the user interface 414 may result in one or more inputs that indicate a subset of information contained in one or more data sets comprising activities of the activity type that occurred during the specified date range and that are associated with entities of the entity type that have the selected attributes. In the example above, the user interface 414 may also include check boxes for segments or cohorts defined in a knowledge graph for the entity type and the activity type selected.

The one or more inputs may specify an anchor event or activity around which to organize the data specified in the one or more inputs. In the above example, the user interface 414 may also include a third drop down menu that allows the user to select an anchor activity type. It may be that the specified date range applies to the anchor activity. A user interacting with the third drop down menu may result in on or more inputs that indicate the subset of information contained in the one or more data sets should include activities of the activity type that are associated with entities of the entity type that have the selected attributes and activities of the anchor activity type that occurred during the specified time range and that are associated with entities of the entity type that have the selected attributes.

In accordance with the above example, a query builder may take the one or more inputs and create a query. The query builder may submit the query to a data store containing a knowledge graph describing the one or more data sets. The query may request and receive from the knowledge graph information needed to build a second query for retrieving the subset of information contained in the one or more data sets indicated by the one or more inputs. The query builder may build the second query using the one or more inputs and the information received from the knowledge graph in response to the query. The query builder may submit the second query to a second data store where the one or more data sets reside. The second data store may return the subset. A system could then generate a report based on the subset. For example, expanding on the example above, a system could then generate a report showing when activities of the activity type occurred in relation to activities of the anchor activity type. The report may be in a visual format. The report may be in a timeline format. For example, all the activities of the anchor activity type may be shown as having occurred on the same day and the occurrence of the activities of the activity type could be shown on the timeline relative to their associated activity of the anchor activity type. If the anchor activity type is subscription cancellation and the activity type is submitting a complaint, a timeline format may show when users submitted complaints relative to cancelling their subscriptions.

Figure 5:
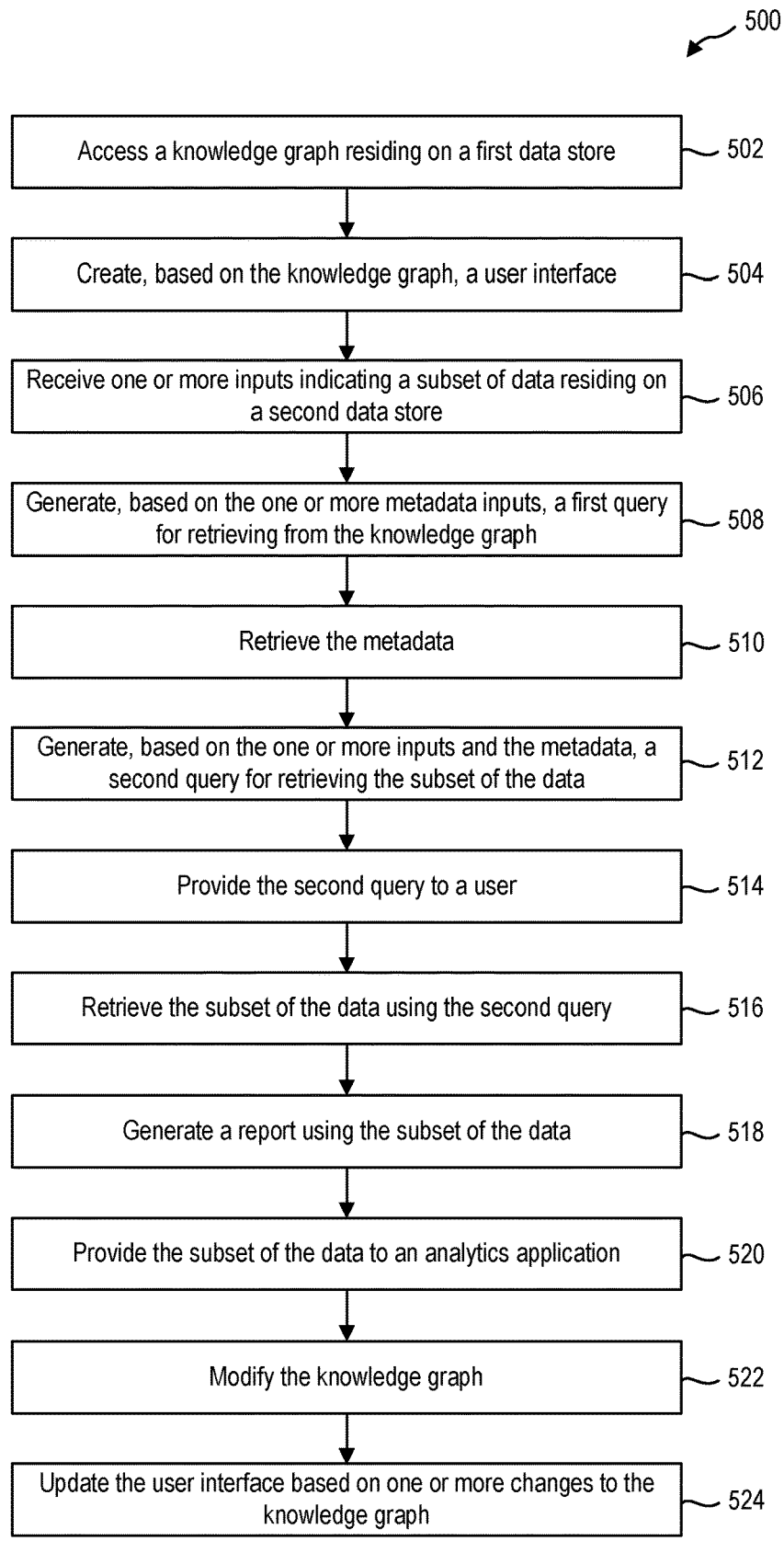
FIG. 5 illustrates an example method for automatically generating a data retrieval query using a knowledge graph.

FIG. 5 illustrates an example of a method 500 for automatically generating a query for retrieving a subset of data from a data store. For the sake of clarity, the method will be described in relation to the systems, devices, components, and data described previously.

The method 500 may include accessing 502 a knowledge graph residing on a first data store. The knowledge graph may include a semantic model of data. The data may reside on a second data store separate from the first data store. The knowledge graph may be the knowledge graph 112 or the knowledge graph 312. The first data store may be the second data store 104 or the data store 304. Accessing 502 the knowledge graph may include creating the knowledge graph, modifying the knowledge graph, retrieving information from the knowledge graph, or otherwise interacting with the knowledge graph.

The method 500 may include creating 504, based on the knowledge graph, a user interface. The user interface may be the user interface 114 or the user interface 414. A system (such as the system 100 or the query builder 106) may create 504 the user interface without human intervention. Creating 504 the user interface may include creating one or more user interface elements, such as the user interface elements 430a-c. A user may be able to interact with the one or more user interface elements to generate one or more inputs.

The method 500 may include receiving 506 one or more inputs indicating a subset of data residing on a second data store. The data residing on the second data store may be the data described in the knowledge graph. The second data store may be separate and distinct from the first data store. The data may be structured or formatted differently from how the knowledge graph is structure or formatted. The second data store may be the first data store 102 or the data store 202. The data may be the data 110 or the data 210. The user interface may receive the one or more inputs and may receive the one or more inputs through a user's interaction with the user interface elements.

The method 500 may include generating 508, based on the one or more inputs, a first query for retrieving metadata from the knowledge graph. A query builder, such as query builder 106, may generate 508 the first query. The knowledge graph may include a semantic model of the data. The semantic model may include metadata describing the data. The first query may indicate metadata associated with the subset of the data. The first query may indicate metadata needed to build a second query for retrieving the subset of the data from the second data store. The first query may be in a query language understandable by the first data store.

The method 500 may include retrieving 510 the metadata. Retrieving 510 the metadata may include submitting the first query to the first data store and receiving the metadata from the first data store. The first data store may include a management system, such as the management system 318, that receives the first query and retrieves information responsive to the first query. The metadata may be responsive to the first query. The metadata may be associated with the subset of the data.

The method 500 may include generating 512, based on the one or more inputs and the metadata, a second query for retrieving the subset of the data. A query builder, such as the query builder 106, may generate 512 the second query. The query builder may generate 512 the second query without human intervention. The second query may be in a query language understandable by the second data store. The second query may be in a query language different from the query language of the first query. The second query, when submitted to the second data store, may cause the second data store to return the subset of the data. The second query may describe one or more operations for the second data store to perform.

The method 500 may include providing 514 the second query to a user. Providing 514 the second query to the user may include one or more of displaying the second query to the user, creating a text document containing the second query, or sending the second query to the user. Providing 514 the second query to the user may include providing the second query to more than one user.

The method 500 may include retrieving 516 the subset of the data using the second query. Retrieving 516 the subset of the data using the second query may include submitting the second query to the second data store and receiving the subset of the data from the second data store. The second data store may return the subset of the data in query results, such as the query results 120.

The method 500 may include generating 518 a report using the subset of the data. The report may provide the subset of the data in a visual format. Generating 518 the report may include creating a document whose contents are based at least in part on the subset of the data.

The method 500 may include providing 520 the subset of the data to an analytics application. The analytics application may perform analysis on the subset of the data and produce a report on the results of the analysis. The analytics application may display the results of the analysis in a visual format.

The method 500 may include modifying 522 the knowledge graph. The knowledge graph may be modified in response to changes to the data. For example, a new entity type may be added to the data. In that case, it may be that a new node representing that entity type is added to the knowledge graph.

The method 500 may include updating 524 the user interface based on one or more changes to the knowledge graph. A query builder (such as the query builder 106) may update 524 the user interface automatically and without human intervention. For example, if a new node representing a new entity type is added to the knowledge graph, the query builder may modify one or more user interface elements included in the user interface. The modified one or more user interface elements may allow the user to indicate a subset of data that includes data associated with the new entity type.

Figure 6:
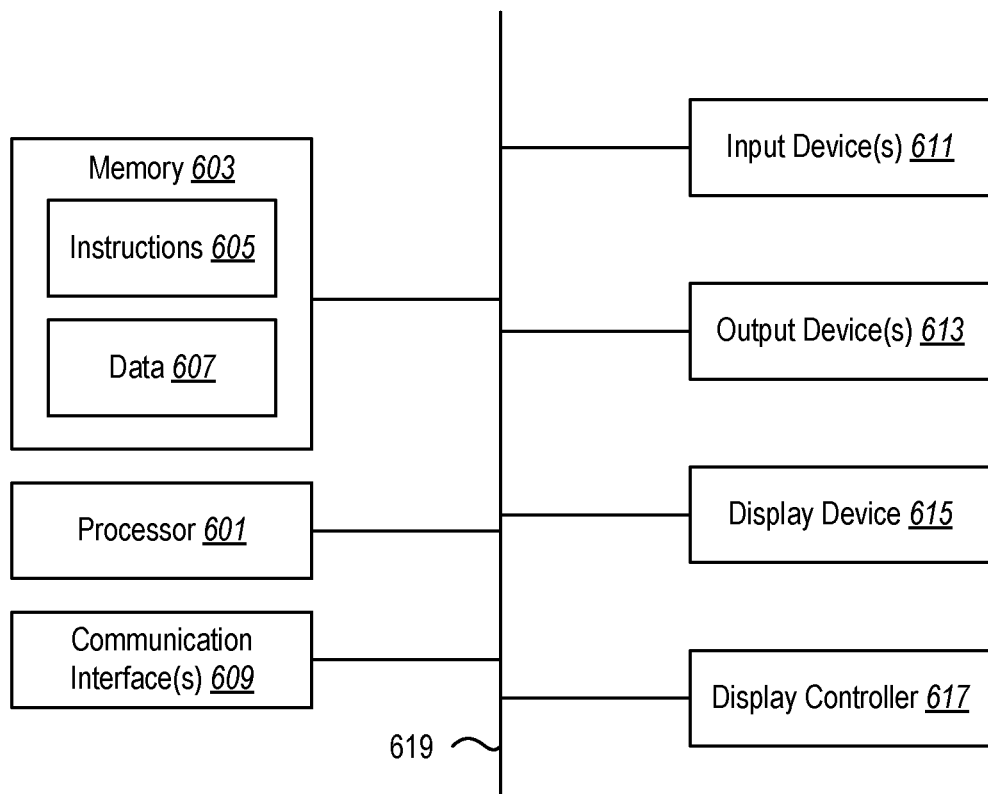
FIG. 6 illustrates certain components that may be included in a computing system.

FIG. 6 illustrates certain components that may be included within a computer system 600. One or more computer systems 600 may be used to implement the various devices, components, and systems described herein.

The computer system 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A non-transitory computer-readable medium comprising instructions that are executable by one or more processors to cause a computing system to:
    access a knowledge graph residing on a data store, the knowledge graph containing a semantic model of data having a first format, wherein the knowledge graph has a second format that is different from the first format of the data;
    create, based on the knowledge graph, a user interface, the user interface including one or more user interface elements, wherein the one or more user interface elements allow a user to indicate a subset of the data;
    receive one or more inputs from the user through the one or more user interface elements, the one or more inputs indicating the subset of the data;
    generate, based on the one or more inputs, a first query for retrieving metadata from the knowledge graph, wherein the metadata indicates how to perform one or more operations for extracting the subset of the data, and wherein the semantic model includes information about the data that is not contained in the data and that cannot be ascertained from querying the data;
    receive the metadata; and
    generate, based on the one or more inputs and the metadata, a second query for retrieving the subset of the data.

2. The non-transitory computer-readable medium of claim 1, further comprising additional instructions that are executable by the one or more processors to cause the computing system to: update the user interface based on changes to the knowledge graph.

3. The non-transitory computer-readable medium of claim 1, wherein the first query is in a first query language, the second query is in a second query language, and the first query language is different from the second query language.

4. A method for generating a data retrieval query, comprising:
   accessing a knowledge graph residing on a data store, the knowledge graph containing a semantic model of data having a first format, wherein the knowledge graph has a second format that is different from the first format of the data;
   creating, based on the knowledge graph, a user interface, the user interface including one or more user interface elements, wherein the one or more user interface elements allow a user to indicate a subset of the data;
   receiving one or more inputs from the user through the one or more user interface elements, the one or more inputs indicating the subset of the data;
   generating, based on the one or more inputs, a first query for retrieving metadata from the knowledge graph, wherein the metadata indicates how to perform one or more operations for extracting the subset of the data, and wherein the semantic model includes information about the data that is not contained in the data and that cannot be ascertained from querying the data; receiving the metadata; and
   generating, based on the one or more inputs and the metadata, a second query for retrieving the subset of the data.

5. The method of claim 4, wherein the first format is a relational database and wherein the second format is a graph database.

6. The method of claim 4, wherein the knowledge graph resides on a second data store, the second data store being distinct from the data store.

7. The method of claim 6, wherein the knowledge graph has a second structure different from a first structure of the data, and wherein the second format is based at least in part on the second structure.

8. The method of claim 7, wherein the knowledge graph is stored on the second data store as simple tables or NoSQL documents.

9. The method of claim 4, further comprising providing the data retrieval query to the user.

10. The method of claim 9, further comprising:
   using the data retrieval query to extract the subset of the data; and
   generating a report using the subset of the data.

11. The method of claim 4, wherein the data includes a first data set and a second data set and the subset of the data includes at least a portion of the first data set and at least a portion of the second data set.

12. The method of claim 4, wherein the data includes two or more entity types and the knowledge graph includes properties for each entity type.

13. A system for generating a data retrieval query, comprising:
   one or more processors;
   memory in electronic communication with the one or more processors; and
   instructions stored in the memory, the instructions being executable by the one or more processors to:
      access a knowledge graph residing on a data store, the knowledge graph containing a semantic model of data having a first format, wherein the knowledge graph has a second format that is different from the first format of the data;
      create, based on the knowledge graph, a user interface, the user interface including one or more user interface elements, wherein the one or more user interface elements allow a user to indicate a subset of the data;
      receive one or more inputs from the user through the one or more user interface elements, the one or more inputs indicating the subset of the data;
      generate, based on the one or more inputs, a first query for retrieving metadata from the knowledge graph, wherein the metadata indicates how to perform one or more operations for extracting the subset of the data, and wherein the semantic model includes information about the data that is not contained in the data and that cannot be ascertained from querying the data;
      receive the metadata; and
      generate, based on the one or more inputs and the metadata, a second query for retrieving the subset of the data.

14. The system of claim 13, wherein the first format is a relational database and wherein the second format is a graph database.

15. The system of claim 13, wherein the knowledge graph resides on a second data store, the second data store being distinct from the data store.

16. The system of claim 15, wherein the knowledge graph has a second structure different from a first structure of the data, and wherein the second format is based at least in part on the second structure.

17. The system of claim 16, wherein the knowledge graph is stored on the second data store as simple tables or NoSQL documents.

18. The system of claim 13, further comprising additional instructions that are executable by the one or more processors to provide the data retrieval query to the user.

19. The system of claim 13, wherein the data includes a first data set and a second data set and the subset of the data includes at least a portion of the first data set and at least a portion of the second data set.

20. The system of claim 13, wherein the data includes two or more entity types and the knowledge graph includes properties for each entity type.

* * * * *